United States Patent
Wagener

(10) Patent No.: US 9,521,473 B2
(45) Date of Patent: Dec. 13, 2016

(54) WAVELENGTH SELECTIVE SWITCH WITH INCREASED FREQUENCY SEPARATION TO AVOID CROSSTALK

(71) Applicant: NISTICA, INC., Bridgewater, NJ (US)

(72) Inventor: Jefferson L. Wagener, Morristown, NJ (US)

(73) Assignee: Nistica, Inc., Bridgewater, NJ (US)

( * ) Notice: Subject to any disclaimer, the term of this patent is extended or adjusted under 35 U.S.C. 154(b) by 46 days.

(21) Appl. No.: 14/618,324

(22) Filed: Feb. 10, 2015

(65) Prior Publication Data

US 2016/0234575 A1    Aug. 11, 2016

(51) Int. Cl.
*H04Q 11/00* (2006.01)

(52) U.S. Cl.
CPC ..... *H04Q 11/0005* (2013.01); *H04Q 2011/003* (2013.01); *H04Q 2011/0007* (2013.01); *H04Q 2011/0026* (2013.01); *H04Q 2011/0035* (2013.01)

(58) Field of Classification Search
CPC .............. H04Q 11/0005; H04Q 2011/0007; H04Q 2011/0026; H04Q 2011/0022; H04Q 2011/003
USPC ......................................... 398/48
See application file for complete search history.

(56) References Cited

U.S. PATENT DOCUMENTS

| | | |
|---|---|---|
| 6,430,328 B1 | 8/2002 | Culver et al. |
| 6,956,687 B2 | 10/2005 | Moon et al. |
| 7,092,599 B2 | 8/2006 | Frisken |
| 7,123,833 B2 | 10/2006 | Szczepanek et al. |
| 7,126,740 B2 | 10/2006 | Szczepanek et al. |
| 7,142,789 B1* | 11/2006 | Weiner ............. H04B 10/25073 398/189 |
| 7,397,980 B2 | 7/2008 | Frisken |
| 2007/0217739 A1 | 9/2007 | McGreer et al. |
| 2008/0316585 A1 | 12/2008 | Cohen |
| 2011/0033151 A1 | 2/2011 | Cohen et al. |
| 2012/0002917 A1 | 1/2012 | Colbourne |
| 2013/0128215 A1 | 5/2013 | Sakurai |
| 2014/0023316 A1 | 1/2014 | McLaughlin |
| 2014/0072302 A1* | 3/2014 | Iwama ............... H04Q 11/0005 398/48 |
| 2014/0285867 A1 | 9/2014 | Wagener |

FOREIGN PATENT DOCUMENTS

| | | |
|---|---|---|
| JP | 2008-139477 | 6/2008 |
| JP | 2010-026427 | 2/2010 |
| WO | 2012-123715 | 9/2012 |
| WO | 2014015129 A1 | 1/2014 |

* cited by examiner

*Primary Examiner* — Leslie Pascal
(74) *Attorney, Agent, or Firm* — Stuart H. Mayer; Mayer & Williams PC

(57) ABSTRACT

An optical device incorporates into the same physical structure the functionality of two or more wavelength selective switches. The wavelength components associated with the first optical switch are isolated from the wavelength components associated with the second optical switch by their spatial displacement along one axis on a programmable optical phase modulator. Remaining crosstalk between the components is reduced by spatially separating the components of the two wavelength switches having the same wavelength along another axis of the programmable optical phase modulator.

36 Claims, 5 Drawing Sheets

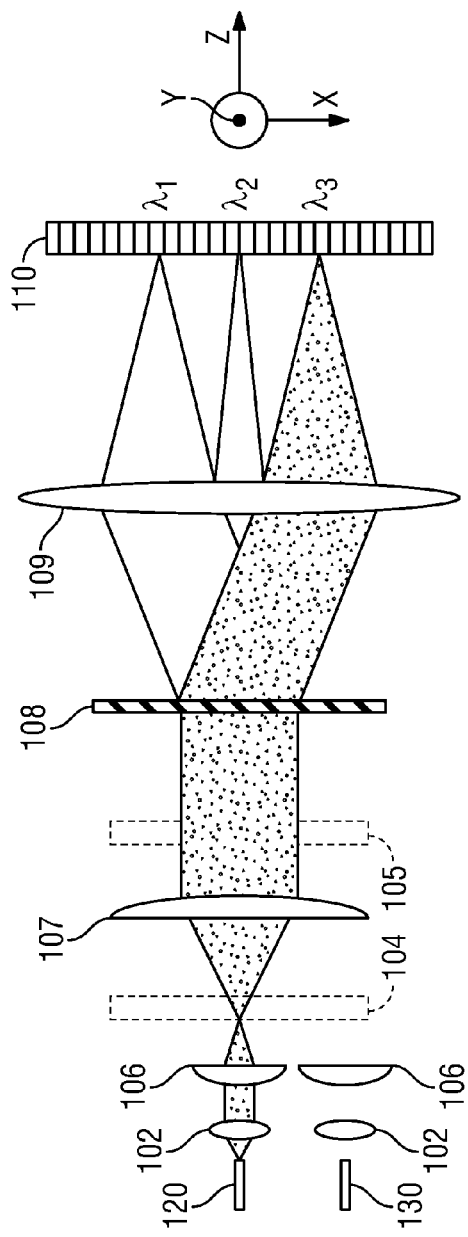
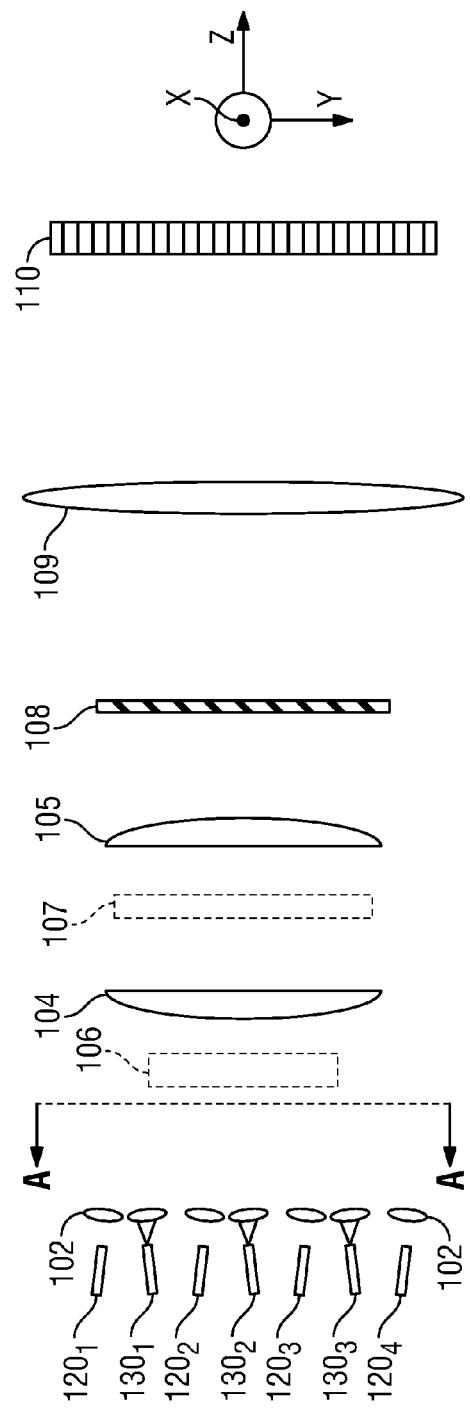
FIG. 4A
FIG. 4B

WAVELENGTH SELECTIVE SWITCH WITH INCREASED FREQUENCY SEPARATION TO AVOID CROSSTALK

BACKGROUND

In an optical communication network, optical signals having a plurality of optical channels at individual wavelengths (channels), are transmitted from one location to another, typically through a length of optical fiber. An optical cross-connect module allows switching of optical signals from one optical fiber to another. A wavelength-selective optical cross-connect, or wavelength selective switch (WSS), allows reconfigurable wavelength-dependent switching, that is, it allows certain wavelength channels to be switched from a first optical fiber to a second optical fiber while letting the other wavelength channels propagate in the first optical fiber, or it allows certain wavelength channels to be switched to a third optical fiber. An optical network architecture based on wavelength-selective optical switching, has many attractive features due to the ability to automatically create or re-route optical paths of individual wavelength channels. It accelerates service deployment, accelerates rerouting around points of failure of an optical network, and reduces capital and operating expenses for a service provider, as well as creating a future-proof topology of the network.

In some cases the functionality of multiple wavelength switches may share a common set of optical elements such as lenses, dispersion elements and a spatial light modulator. Such wavelength selective switches may exhibit undesirable levels of cross talk between the various channels of the functionally different switches.

BRIEF DESCRIPTION OF THE DRAWINGS

FIGS. 4A and 4B are top and side views respectively of one example of a simplified optical device such as a free-space WSS 100 that may be used in conjunction with embodiments of the present invention.

SUMMARY

In accordance with one aspect of the disclosure, an optical device includes an optical port array, a dispersion element, a focusing element and a programmable optical phase modulator. The optical port array has a first plurality of ports for receiving optical beams and a second plurality of ports for receiving optical beams. An offset axis extends through both the first and second planes. The ports in the first plurality of ports are laterally displaced from the ports in the second plurality of ports along the offset axis. The dispersion element receives a first of the optical beams from one of the first plurality of ports and a second of the optical beams from the second plurality of ports. The dispersion element spatially separates the optical beams into respective first and second pluralities of wavelength components along first and second wavelength dispersion axes. The first plurality of ports has optical axes extending along a first direction and the second plurality of ports has optical axes extending along a second direction. The first and second directions are different from one another. At least one of the first and second directions are non-orthogonal to the port axis. The focusing element focuses the first and second pluralities of wavelength components. The programmable optical phase modulator receives the focused plurality of wavelength components. The programmable optical phase modulator is configured to steer the wavelength components received from any one of the first plurality of ports to a selected one of the first plurality of ports and is further configured to steer the wavelength components received from any one of the second plurality of ports to a selected one of the second plurality of ports.

In accordance with one embodiment, both the first and second directions are non-orthogonal to the offset axis and defines an acute angle greater than 0° with respect to one another.

In accordance with another embodiment, the first and second wavelength dispersion axes and the programmable optical phase modulator extend in a common plane.

DETAILED DESCRIPTION

Figure 1:
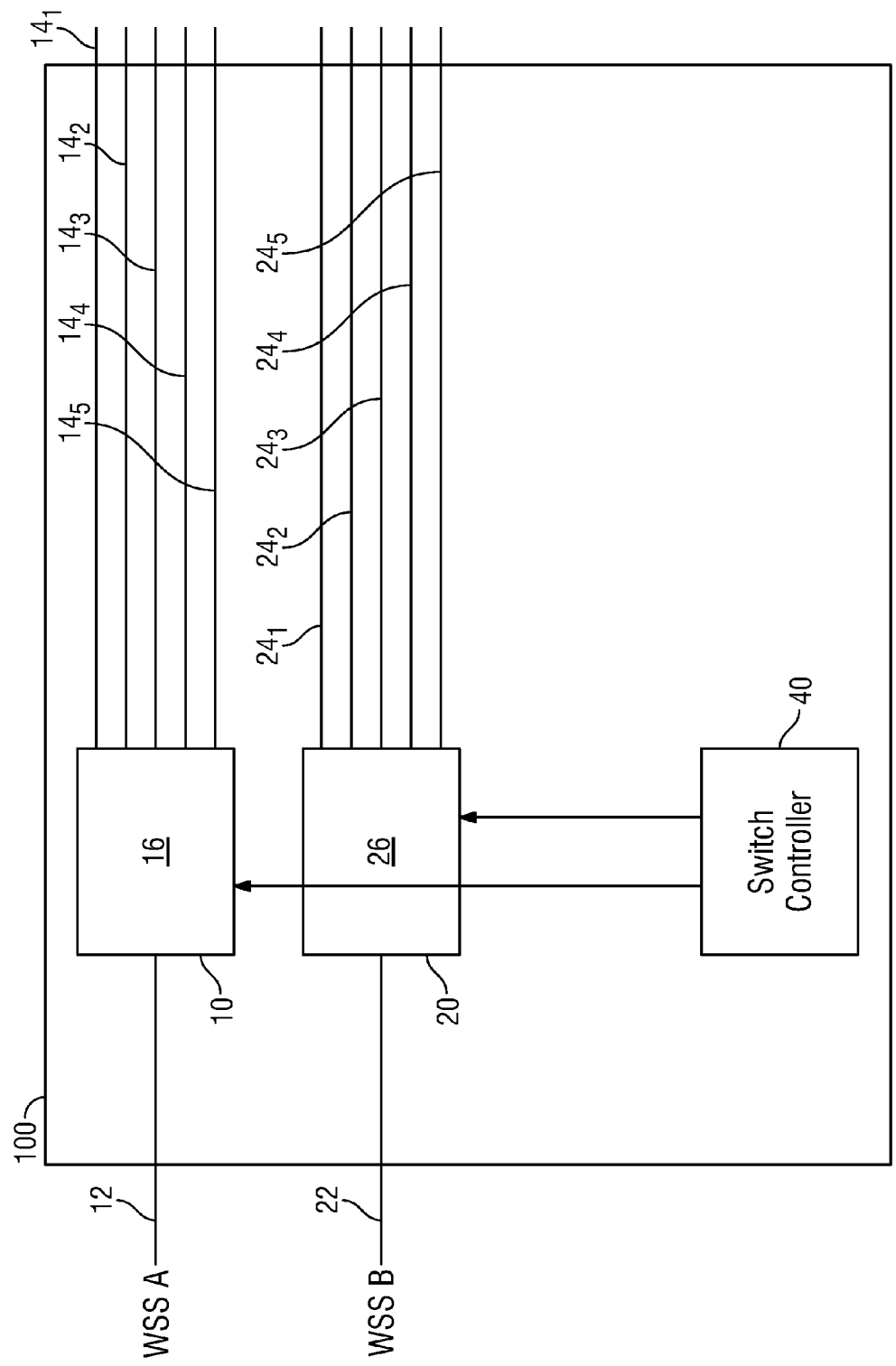
FIG. 1 shows a functional block diagram of one example of a wavelength selective switch.

FIG. 1 shows a functional block diagram of one example of a wavelength selective switch (WSS) 100 that in some cases may also include an integrated channel monitor. As shown, three distinct functions are depicted: two 1xn WSSs, represented by WSSs 10 and 20, and an optical channel monitor 30 (OCM). It should be noted, however, that as will be described below, the different functions may be incorporated into a single physical switching device.

WSS 10 includes an input port 12 and output ports $14_1$, $14_2$, $14_3$, $14_4$ and $14_5$ ("14"). A switching fabric 16 optically couples the input port 12 to the output ports 14 so that an optical signal received at the input port 12 can be selectively directed to one of the output ports 14 under the control of a switch controller 40. Similarly, WSS 20 includes an input port 22 and output ports $24_1$, $24_2$, $24_3$, $24_4$ and $24_5$ ("24"). A switching fabric 26 optically couples the input port 22 to the output ports 24 so that an optical signal received at the input port 22 can be selectively directed to one of the output ports 24 under the control of the switch controller 40.

It should be noted that while the WSSs 10 and 20 are depicted as having five output ports, more generally any number of output ports may be employed, and this number may be the same or different among the two functional elements.

The functionality of an optical device such as shown in FIG. 1 may be implemented using most of the same optical elements for the two optical switching functions. Such a device may employ a spatial light modulator such as an LCoS that is common to both wavelength selective switches.

Figure 2:
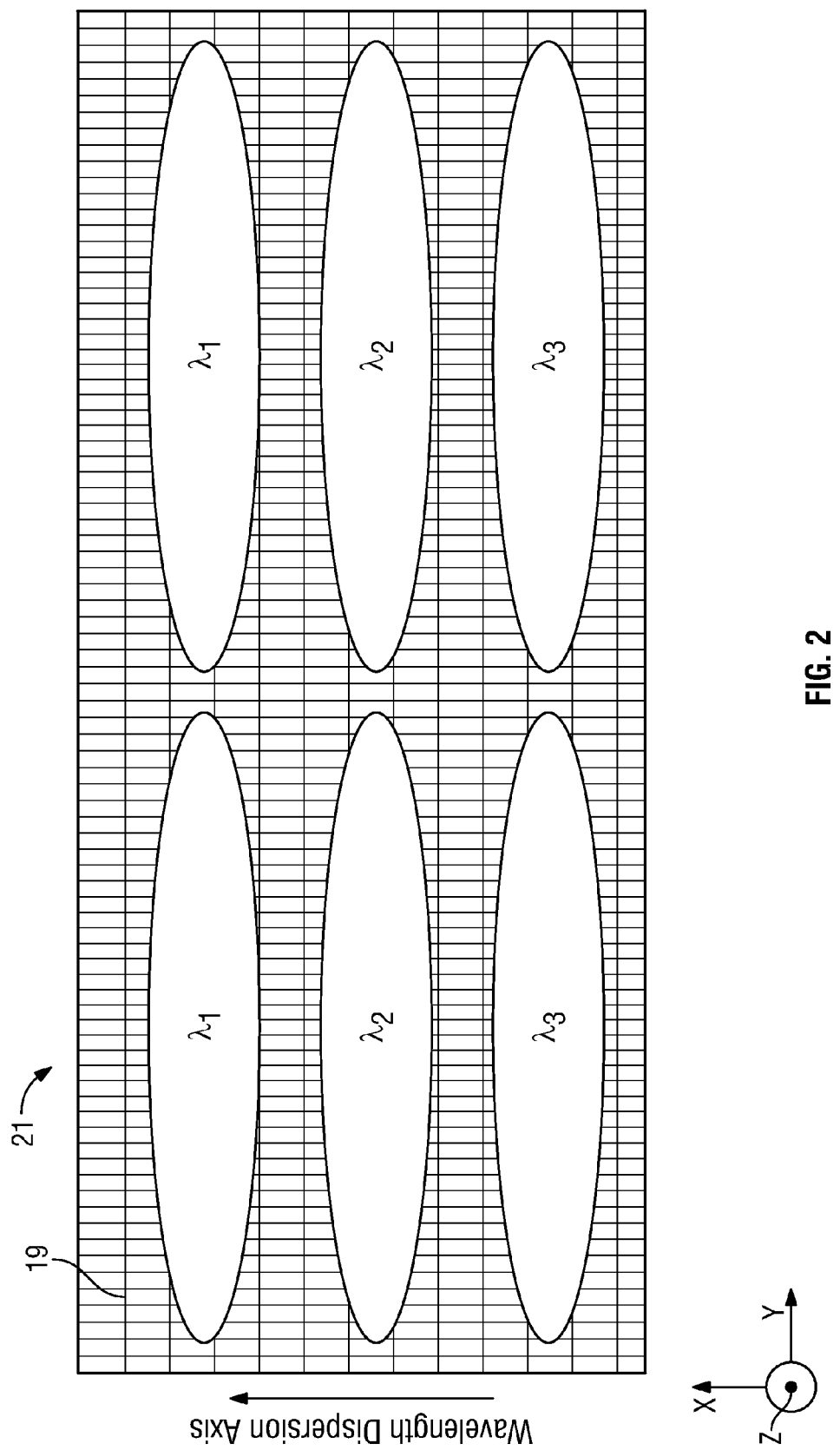
FIG. 2 is a front view of a LCoS device that may be employed as the spatial light modulator for the optical device shown in FIG. 1.

FIG. 2 is a front view of a LCoS device 21 that may be employed as the spatial light modulator for the optical device shown in FIG. 1. The three wavelength components $\lambda_1$, $\lambda_2$ and $\lambda_3$ for a first of the optical switches are shown along the upper portion of the LCoS device 21. The wavelength components $\lambda_1$, $\lambda_2$ and $\lambda_3$ are spatially separated along the wavelength dispersion axis (x-axis) and extend along multiple pixels 19 of the LCoS device 21. Likewise, the three wavelength components $\lambda'_1$, $\lambda'_2$ and $\lambda'_3$ for a second of the optical switches are shown along the lower portion of the LCoS device 21. The wavelength components $\lambda'_1$, $\lambda'_2$ and $\lambda'_3$ are also spatially separated along the wavelength dispersion axis (x-axis). It should be noted that while the optical beams of the wavelength components are illustrated as having an oval cross-sectional shape, more generally the optical beams may have any cross-sectional shape, including but not limited to circular and crescent shapes. In addition, those of ordinary skill in the art will recognize that the number of wavelength components may vary from implementation to implementations and that three wavelength components are shown for purposes of illustration only.

The wavelength components associated with the first optical switch are isolated from the wavelength components associated with the second optical switch by their spatial displacement with respect to one another along the y-axis, which is referred to herein as the port axis. Nevertheless some crosstalk remains, particularly between components of the two optical switches that have the same wavelength (e.g., wavelength component $\lambda_1$ of the first optical switch and wavelength component $\lambda'_1$ of the second optical switch). One way to reduce this crosstalk is to further spatially separate the components of the two optical switches having the same wavelength.

Figure 3:
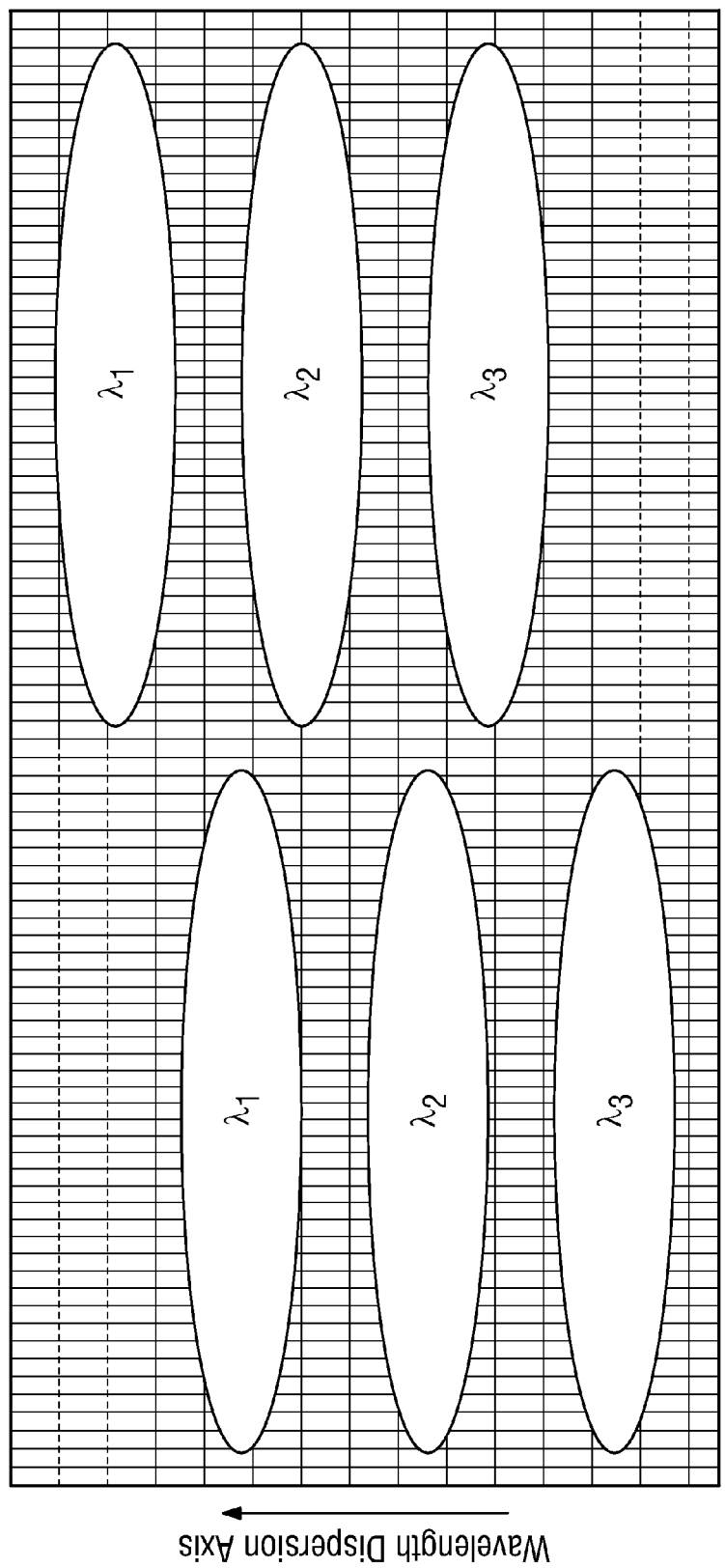
FIG. 3 shows the front view of the LCoS device where the wavelength components of the two wavelength selective switches are spatially separated from one another.

One way to accomplish this additional isolation is to spatially offset the first set of wavelength components (associated with the first switch) along the wavelength dispersion axis (i.e., the x-axis in FIG. 2) from the second set of wavelength components (associated with the second switch). That is, corresponding pairs of wavelengths in each set are spatially offset from one another along the wavelength dispersion axis (e.g., pairs $\lambda_1$ and $\lambda'_1$ are offset from one another, pairs $\lambda_2$ and $\lambda'_2$ are offset from one another and pairs $\lambda_3$ and $\lambda'_3$ are offset from one another). FIG. 3 shows the front view of the LCoS device 21 where the wavelength components are spatially separated in this manner. The magnitude of the offsets may be application specific and may vary from implementation to implementation. However, in general a significant degree of additional isolation may be achieved by using an offset that is not small in comparison to the effective beam diameter. For example, an offset between half a beam diameter and 2 beam diameters may be useful in various situations to significantly improve isolation.

One example of a WSS that may be used to provide the pattern of wavelength components shown in FIG. 3 will be described below with reference to FIGS. 4A and 4B.

FIGS. 4A and 4B are top and side views respectively of one example of a simplified optical device such as a free-space WSS 100 that may be used in conjunction with embodiments of the present invention. Light is input and output to the WSS 100 through optical waveguides such as optical fibers which serve as input and output ports. A fiber collimator array 101 includes a first series of fibers 120, which are associated with WSS 10 shown in FIG. 1, and a second series of fibers 130, which are associated with WSS 20 shown in FIG. 1. Each individual fiber is associated with a collimator 102, which converts the light from each fiber to a free-space beam.

As best seen in FIG. 4b, the fibers 120$_1$, 120$_2$, 120$_3$ and 120$_4$ in the first fiber series 120 are interleaved with the fibers 130$_1$, 130$_2$ and 130$_3$ in the second fiber series 130. Moreover, as also shown in FIG. 4b, the fibers in the fiber series 120 are angularly offset from fibers in the second fiber series 130. This angular offset causes the wavelengths associated with the two different WSSs 10 and 20 to be spatially offset from one another on the LCoS device 21 in the y-direction (the port axis), as shown in FIG. 2.

As best seen in FIG. 4A, the fibers in the first fiber series 120 extend in a first common plane, which is defined as the y-z plane in FIGS. 4A and 4B. Likewise, the fibers in the second fiber series 130 extend in a second common plane parallel to and offset from the first common plane. This offset between the first and second fiber series causes the spatial offset in the x-direction (the wavelength dispersion axis) shown in FIG. 3 between common wavelength components associated with the first and second WSSs 10 and 20.

A pair of telescopes or optical beam expanders magnifies the free space light beams from the port array 101. A first telescope or beam expander is formed from optical elements 106 and 107 and a second telescope or beam expander is formed from optical elements 104 and 105.

In FIGS. 4A and 4B, optical elements which affect the light in two axes are illustrated with solid lines as bi-convex optics in both views. On the other hand, optical elements which only affect the light in one axis are illustrated with solid lines as plano-convex lenses in the axis that is affected. The optical elements which only affect light in one axis are also illustrated by dashed lines in the axis which they do not affect. For instance, in FIGS. 4A and 4B the optical elements 102, 108, 109 and 110 are depicted with solid lines in both figures. On the other hand, optical elements 106 and 107 are depicted with solid lines in FIG. 4A (since they have focusing power along the y-axis) and with dashed lines in FIG. 4B (since they leave the beams unaffected along the x-axis). Optical elements 104 and 105 are depicted with solid lines in FIG. 4B (since they have focusing power along the x-axis) and with dashed lines in FIG. 4A (since they leave the beams unaffected in the y-axis).

Each telescope may be created with different magnification factors for the x and y directions. For instance, the magnification of the telescope formed from optical elements 104 and 105, which magnifies the light in the x-direction, may be less than the magnification of the telescope formed from optical elements 106 and 107, which magnifies the light in the y-direction.

The pair of telescopes magnifies the light beams from the port array 101 and optically couples them to a wavelength dispersion element 108 (e.g., a diffraction grating or prism), which separates the free space light beams into their constituent wavelengths or channels. The wavelength dispersion element 108 acts to disperse light in different directions on an x-y plane according to its wavelength. The light from the dispersion element is directed to beam focusing optics 109.

Beam focusing optics 109 couple the wavelength components from the wavelength dispersion element 108 to a programmable optical phase modulator, which may be, for example, a liquid crystal-based phase modulator such as a LCoS device 110. The programmable optical phase modulator produces a phase shift at each of its pixels which gives rise to a phase shift profile across its surface. As shown in FIG. 3, the wavelength components are dispersed along the x-axis. Accordingly, each wavelength component of a given wavelength is focused on an array of pixels 19 extending in the y-direction. By way of example, and not by way of limitation, three such wavelength components having center wavelengths denoted $\lambda_1$, $\lambda_2$ and $\lambda_3$ are shown in FIG. 4A being focused on the LCoS device 110 along the wavelength dispersion axis (x-axis).

As best seen in FIG. 4B, after reflection from the LCoS device 110, each wavelength component can be coupled back through the beam focusing optics 109, wavelength dispersion element 108 and optical elements 106 and 107 to a selected fiber in the port array 101. Accordingly, appropriate manipulation of the pixels 19 in the y-axis allows selective independent steering of each wavelength component to a selected output fiber.

Figure 5:
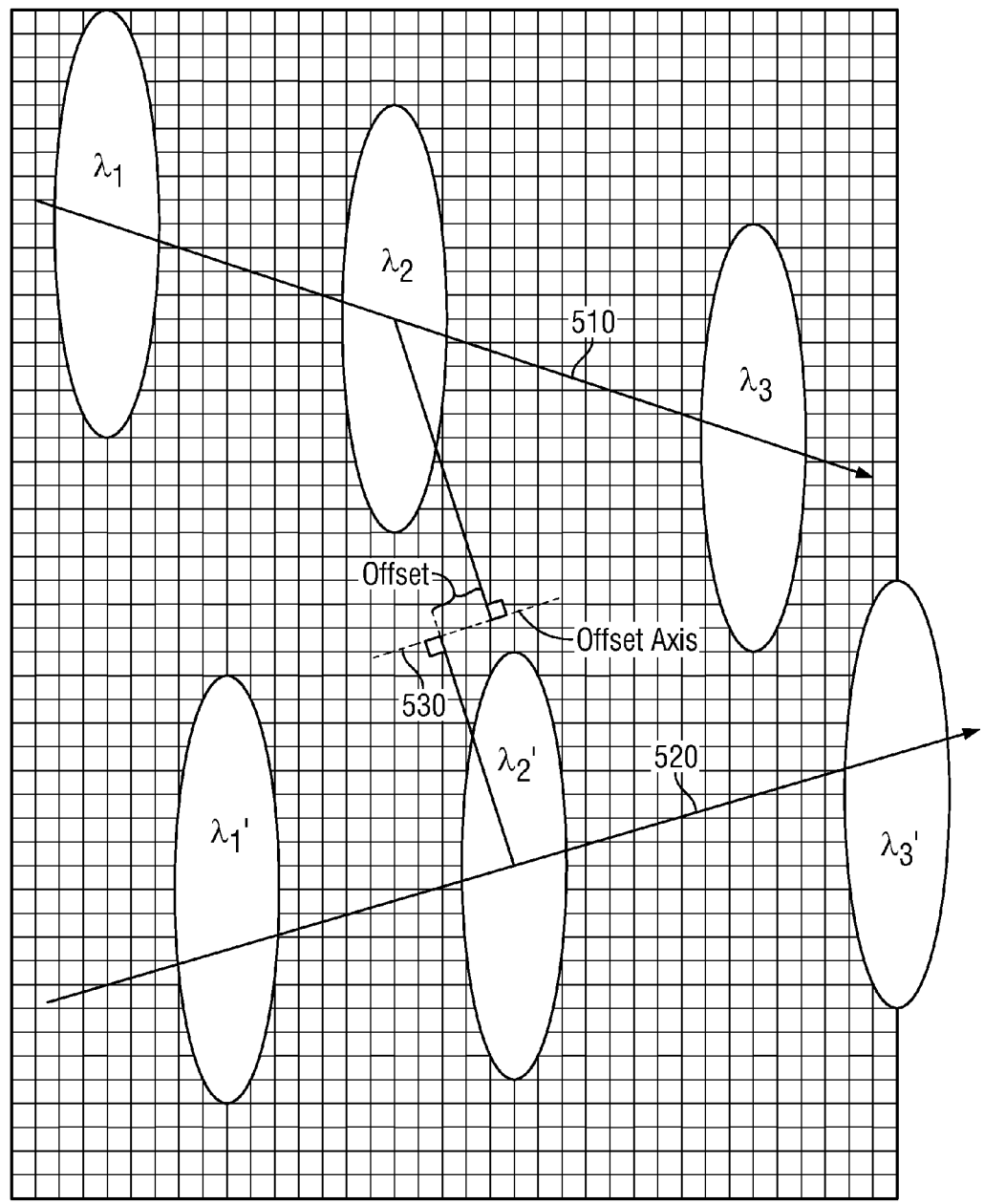
FIG. 5 shows a front view of the LCoS device of FIGS. 2 and 3 where the wavelength components of a first optical switch extend along a first wavelength dispersion axis the wavelength components for a second optical switch extend along the second wavelength dispersion axis.

In the examples described above, the wavelength dispersion axis is coincident with the pixel grid axis. However, more generally, the wavelength dispersion axis may extend in any direction on the LCoS device 21. Moreover, the wavelength components associated with the first optical switch and the wavelength components associated with the second optical switch may be spatially separated along different wavelength dispersion axes. For instance, FIG. 5 shows a front view of the LCoS device 21 of FIGS. 2 and 3 in which the three wavelength components $\lambda_1$, $\lambda_2$ and $\lambda_3$ for the first optical switch extend along the first wavelength dispersion axis 510 and the three wavelength components $\lambda'_1$, $\lambda'_2$ and $\lambda'_3$ for the second of the optical switches extend along the second wavelength dispersion axis 520. As shown, the first and second wavelength dispersion axes are not parallel to one another, nor are either of them coincident with the pixel grid of the LCoS device 21. The wavelength dispersion axes may be defined a number of different ways. For instance, they may be defined by a linear fit to the center of mass of each beam extending along each axis. If desired, an average dispersion axis can then be defined for the two wavelength dispersion axes. As shown in FIG. 5, the offset along an offset axis 530 between corresponding wavelength components in each set of components may be calculated with reference to a suitable set of axes, including the wavelength dispersion axes, the pixel grid axes, the average dispersion axis, and so on.

The invention claimed is:

1. An optical device, comprising:
   an optical port array having a first plurality of ports for receiving optical beams and a second plurality of ports for receiving optical beams, an offset axis extending through both the first and second planes, the ports in the first plurality of ports being laterally displaced from the ports in the second plurality of ports along the offset axis;
   a dispersion element receiving a first of the optical beams from one of the first plurality of ports and a second of the optical beams from the second plurality of ports and spatially separating the optical beams into respective first and second pluralities of wavelength components along first and second wavelength dispersion axes that are each orthogonal to a port axis, the first plurality of ports being interleaved with the second plurality of ports along the port axis, the first plurality of ports having optical axes extending along a first direction and the second plurality of ports having optical axes extending along a second direction, the first and second directions being different from one another, at least one of the first and second directions being non-orthogonal to the port axis;
   a focusing element for focusing the first and second pluralities of wavelength components; and
   a programmable optical phase modulator for receiving the focused plurality of wavelength components, the modulator being configured to steer the wavelength components received from any one of the first plurality of ports to a selected one of the first plurality of ports and being further configured to steer the wavelength components received from any one of the second plurality of ports to a selected one of the second plurality of ports.

2. The optical device of claim 1 wherein both the first and second directions are non-orthogonal to the offset axis and defines an acute angle greater than 0° with respect to one another.

3. The optical device of claim 1 wherein the dispersive element is selected from the group consisting of a diffraction grating and a prism.

4. The optical device of claim 1 wherein the first and second wavelength dispersion axes and the programmable optical phase modulator extend in a common plane.

5. The optical device of claim 1 wherein the first plurality of ports extend in a first plane and the second plurality of ports extend in a second plane parallel to the first plane.

6. The optical device of claim 5 wherein the offset axis extends orthogonally through both the first and second plane.

7. The optical device of claim 1 wherein the programmable optical phase modulator includes a liquid crystal-based phase modulator.

8. The optical device of claim 7 wherein the liquid crystal-based phase modulator is a LCoS device.

9. The optical device of claim 1 further comprising an optical system for magnifying the optical beam received from the optical port array and directing the magnified optical beam to the dispersion element.

10. The optical device of claim 9 wherein the optical system has a first magnification factor in a first direction and a second magnification factor in a second direction orthogonal to the first direction, the first magnification factor being different from the second magnification factor.

11. The optical device of claim 10 wherein the first direction is parallel to at least one of the wavelength dispersion axes along which the optical beam is spatially separated, the first magnification factor being less than the second magnification factor.

12. A method for directing wavelength components of an optical beam from an input port of a port array to at least one output port of the port array, comprising:
   receiving a first optical beam at a first input port of the port array associated with a first wavelength selective switch;
   receiving a second optical beam at a second input port of the port array associated with a second wavelength selective switch;
   magnifying the optical beam in a first direction and a second direction orthogonal to the first direction;
   after magnifying the optical beam, spatially separating the wavelength components of the first and second optical beams;
   focusing the spatially separated wavelength components onto a programmable optical phase modulator so that the wavelength components of the first and second optical beams are spatially separated along at least a pixel axis on the modulator, the wavelength components of the first optical beam being spatially offset from the wavelength components of the second optical beam along the pixel axis; and
   adjusting a phase shift profile of the programmable optical phase modulator to selectively direct individual ones of the wavelength components received from the first input port to another port of the port array associated with the first wavelength selective switch and being further configured to selectively direct individual ones of the wavelength components received from the second input port to another port of the port array associated with the second wavelength selective switch.

13. The method of claim 12 wherein the programmable optical phase modulator includes a liquid crystal-based phase modulator.

14. The method of claim 13 wherein the liquid crystal-based phase modulator is a LCoS device.

15. The method of claim 12 wherein the first direction is parallel to the wavelength dispersion axis along which the first and second optical beams are spatially separated, the magnification in the first direction being less than the magnification in the second direction.

16. An optical device, comprising:
an optical port array having a first plurality of ports for receiving optical beams and a second plurality of ports for receiving optical beams, the first plurality of ports extending in a first plane and the second plurality of ports extending in a second plane parallel to the first plane, an offset axis extending through both the first and second planes, the ports in the first plurality of ports being laterally displaced from the ports in the second plurality of ports along the offset axis;
a dispersion element receiving a first of the optical beams from one of the first plurality of ports and a second of the optical beams from the second plurality of ports and spatially separating the optical beams into respective first and second pluralities of wavelength components along first and second wavelength dispersion axes that are each orthogonal to a port axis, the first plurality of ports having optical axes extending along a first direction and the second plurality of ports having optical axes extending along a second direction, the first and second directions being different from one another, at least one of the first and second directions being non-orthogonal to the port axis;
a focusing element for focusing the first and second pluralities of wavelength components; and
a programmable optical phase modulator for receiving the focused plurality of wavelength components, the modulator being configured to steer the wavelength components received from any one of the first plurality of ports to a selected one of the first plurality of ports and being further configured to steer the wavelength components received from any one of the second plurality of ports to a selected one of the second plurality of ports.

17. The optical device of claim 16 wherein both the first and second directions are non-orthogonal to the offset axis and defines an acute angle greater than 0° with respect to one another.

18. The optical device of claim 16 wherein the first and second wavelength dispersion axes and the programmable optical phase modulator extend in a common plane.

19. The optical device of claim 16 wherein the first plurality of ports extend in a first plane and the second plurality of ports extend in a second plane parallel to the first plane.

20. The optical device of claim 19 wherein the offset axis extends orthogonally through both the first and second plane.

21. The optical device of claim 16 wherein the programmable optical phase modulator includes a liquid crystal-based phase modulator.

22. The optical device of claim 21 wherein the liquid crystal-based phase modulator is a LCoS device.

23. The optical device of claim 16 wherein the dispersive element is selected from the group consisting of a diffraction grating and a prism.

24. The optical device of claim 16 further comprising an optical system for magnifying the optical beam received from the optical port array and directing the magnified optical beam to the dispersion element.

25. The optical device of claim 24 wherein the optical system has a first magnification factor in a first direction and a second magnification factor in a second direction orthogonal to the first direction, the first magnification factor being different from the second magnification factor.

26. The optical device of claim 25 wherein the first direction is parallel to at least one of the wavelength dispersion axes along which the optical beam is spatially separated, the first magnification factor being less than the second magnification factor.

27. An optical device, comprising:
an optical port array having a first plurality of ports for receiving optical beams and a second plurality of ports for receiving optical beams, an offset axis extending through both the first and second planes, the ports in the first plurality of ports being laterally displaced from the ports in the second plurality of ports along the offset axis;
a dispersion element receiving a first of the optical beams from one of the first plurality of ports and a second of the optical beams from the second plurality of ports and spatially separating the optical beams into respective first and second pluralities of wavelength components along first and second wavelength dispersion axes that are each orthogonal to a port axis, the first plurality of ports having optical axes extending along a first direction and the second plurality of ports having optical axes extending along a second direction, the first and second directions being different from one another, at least one of the first and second directions being non-orthogonal to the port axis;
a focusing element for focusing the first and second pluralities of wavelength components; and
a programmable optical phase modulator for receiving the focused plurality of wavelength components, the modulator being configured to steer the wavelength components received from any one of the first plurality of ports to a selected one of the first plurality of ports and being further configured to steer the wavelength components received from any one of the second plurality of ports to a selected one of the second plurality of ports and;
wherein the optical system has a first magnification factor in a first direction and a second magnification factor in a second direction orthogonal to the first direction, the first magnification factor being different from the second magnification factor.

28. The optical device of claim 27 wherein both the first and second directions are non-orthogonal to the offset axis and defines an acute angle greater than 0° with respect to one another.

29. The optical device of claim 27 wherein the first plurality of ports are interleaved with the second plurality of ports along the port axis.

30. The optical device of claim 27 wherein the first and second wavelength dispersion axes and the programmable optical phase modulator extend in a common plane.

31. The optical device of claim 27 wherein the offset axis extends orthogonally through both the first and second plane.

32. The optical device of claim 27 wherein the programmable optical phase modulator includes a liquid crystal-based phase modulator.

33. The optical device of claim 32 wherein the liquid crystal-based phase modulator is a LCoS device.

34. The optical device of claim 27 wherein the dispersive element is selected from the group consisting of a diffraction grating and a prism.

35. The optical device of claim 27 further comprising an optical system for magnifying the optical beam received from the optical port array and directing the magnified optical beam to the dispersion element.

36. The optical device of claim 27 wherein the first direction is parallel to at least one of the wavelength dispersion axes along which the optical beam is spatially separated, the first magnification factor being less than the second magnification factor.

* * * * *